US012779862B2

(12) United States Patent
Toki et al.

(10) Patent No.: US 12,779,862 B2
(45) Date of Patent: Nov. 3, 2026

(54) PRINTING APPARATUS AND A LIQUID STORAGE TANK THAT HAS FIRST AND SECOND RIBS AND AN ABSORBER FOR ABSORBING A PRINTING AGENT

(71) Applicant: CANON KABUSHIKI KAISHA, Tokyo (JP)

(72) Inventors: Nobuhiro Toki, Kanagawa (JP); Yusuke Naratani, Tokyo (JP); Hideaki Matsumura, Tokyo (JP); Hiromasa Tsutsumi, Kanagawa (JP); Erika Iyama, Kanagawa (JP); Taiji Maruyama, Kanagawa (JP); Shota Asada, Tokyo (JP); Norio Sakurai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 157 days.

(21) Appl. No.: 18/778,963

(22) Filed: Jul. 20, 2024

(65) Prior Publication Data

US 2025/0042161 A1 Feb. 6, 2025

(30) Foreign Application Priority Data

Jul. 31, 2023 (JP) ................................ 2023-124469

(51) Int. Cl.
*B41J 2/175* (2006.01)

(52) U.S. Cl.
CPC ......... *B41J 2/1752* (2013.01); *B41J 2/17553* (2013.01)

(58) Field of Classification Search
None
See application file for complete search history.

(56) References Cited

U.S. PATENT DOCUMENTS

2005/0018215 A1* 1/2005 Ruhe ...................... B41J 13/103 358/1.6
2016/0347071 A1 12/2016 Saeki et al. .............. B41J 2/175
(Continued)

FOREIGN PATENT DOCUMENTS

JP 2019-202464 11/2019
JP 2019202464 A * 11/2019 .......... B41J 2/17503
JP 2020-116962 8/2020

OTHER PUBLICATIONS

English translation of JP2019202464A from Google Patents (Year: 2019).*
(Continued)

*Primary Examiner* — Geoffrey S Mruk
*Assistant Examiner* — Shlomit Chelst
(74) *Attorney, Agent, or Firm* — Venable LLP

(57) ABSTRACT

A printing apparatus including a printing unit for printing on a medium, a liquid storage tank storing the printing agent and supplied with the printing agent through a pipe provided to the storage tank so as to extend in a first direction and a holder including a hole portion in which to insert the pipe and a cap that closes and opens the pipe inserted in the hole portion, and positioned in the first direction relative to the storage tank and. The storage tank has a first rib with which a container for supplying the storage tank with the printing agent to be housed therein through the pipe is brought into abutment around the pipe when the container is inserted into the hole portion, a second rib formed to surround a predetermined region connected to a region surrounded by the first rib, and an absorber for absorbing the printing agent.

14 Claims, 9 Drawing Sheets

(56) References Cited

U.S. PATENT DOCUMENTS

| | | | | |
|---|---|---|---|---|
| 2017/0120609 | A1 | 5/2017 | Kimura et al. | B41J 2/175 |
| 2017/0326882 | A1* | 11/2017 | Okude | B41J 2/17506 |
| 2017/0355197 | A1 | 12/2017 | Kudo et al. | B41J 2/17509 |
| 2018/0345675 | A1* | 12/2018 | Kawagoe | B41J 2/17523 |
| 2019/0009562 | A1 | 1/2019 | Abe et al. | B41J 2/165 |
| 2019/0283443 | A1 | 9/2019 | Mukoyama et al. | B41J 2/175 |
| 2019/0299624 | A1* | 10/2019 | Mizutani | B41J 2/17553 |
| 2019/0299649 | A1 | 10/2019 | Shimoyama et al. | B41J 2/045 |
| 2019/0299650 | A1 | 10/2019 | Saeki et al. | B41J 2/18 |
| 2020/0108624 | A1 | 4/2020 | Takahashi et al. | B41J 2/175 |
| 2020/0316973 | A1 | 10/2020 | Toki et al. | B41J 29/38 |
| 2022/0009244 | A1 | 1/2022 | Matsumura et al. | B41J 2/175 |
| 2022/0016893 | A1 | 1/2022 | Nagai et al. | B41J 2/175 |
| 2022/0016894 | A1 | 1/2022 | Nagaoka et al. | B41J 2/175 |
| 2022/0032633 | A1* | 2/2022 | Shimada | B41J 2/17513 |
| 2022/0258487 | A1 | 8/2022 | Jonouchi et al. | B41J 2/175 |
| 2023/0405995 | A1 | 12/2023 | Shimada et al. | B41J 2/175 |
| 2024/0300245 | A1 | 9/2024 | Hayasaka et al. | B41J 2/175 |

OTHER PUBLICATIONS

U.S. Appl. No. 18/759,689, filed Jun. 28, 2024.
U.S. Appl. No. 18/778,949, filed Jul. 20, 2024.
U.S. Appl. No. 18/778,962, filed Jul. 20, 2024.

* cited by examiner

PRINTING APPARATUS AND A LIQUID STORAGE TANK THAT HAS FIRST AND SECOND RIBS AND AN ABSORBER FOR ABSORBING A PRINTING AGENT

CROSS REFERENCE TO PRIORITY APPLICATION

This application claims the benefit of Japanese Patent Application No. 2023-124469, filed Jul. 31, 2023, which is hereby incorporated by reference herein in its entirety.

BACKGROUND OF THE INVENTION

Field of the Invention

The present invention relates to a printing apparatus including a liquid storage tank that stores a liquid, such as an ink, and to the liquid storage tank included in the printing apparatus.

Description of the Related Art

Inkjet printing apparatuses are provided with ink tanks to store inks to be supplied to print heads that eject the inks. In a case when the remaining amount of the ink in any of the ink tanks in such a printing apparatus runs low, for example, an ink supply container is inserted into an ink inlet pipe provided on the ink tank to supply the ink tank with the ink housed in the ink supply container through the ink inlet pipe.

Japanese Patent Laid-Open No. 2020-116962 discloses a technology in which a holder including components in that to insert ink inlet pipes for supplying ink tanks with inks and which are engageable with ink supply containers is provided with openable caps that close and open the ink inlet pipes. Moreover, Japanese Patent Laid-Open No. 2020-116962 discloses positioning of such a holder in the front-rear direction and the left-right direction relative to the ink tanks and in the up-down direction relative to the apparatus' housing.

Also, Japanese Patent Laid-Open No. 2019-202464 discloses a technology to stably insert an ink inlet pipe into an ink supply container. Specifically, the configuration is such that the ink supply container is inserted over the ink inlet pipe inserted in a through-hole in the bottom surface of a recess formed in a holder, and the ink supply container is engaged with the recess in a case of inserting the ink supply container.

However, in the technology of Japanese Patent Laid-Open No. 2020-116962, the holder is positioned in the up-down direction relative to the housing, and therefore the holder is susceptible to positional errors in the up-down direction relative to the ink tanks. Thus, there is a possibility of failing to properly close the ink inlet pipes with the caps provided on the holder. This in turn leads to a possibility that, even with the ink inlet pipes closed with the caps, the inks may leak through the ink inlet pipes and the leaked inks attached to the ink inlet pipes may solidify. Consequently, there is a possibility of failing to properly insert the ink inlet pipes into the ink supply containers at the time of supplying the ink tanks with the inks and thus to stably supply the inks.

Also, in the technology disclosed in Japanese Patent Laid-Open No. 2019-202464, the configuration is such that the ink supply container is brought into abutment with the bottom surface of the recess provided in the holder in the case of being engaged with the recess. Thus, there is a possibility that the amount of insertion of the ink inlet pipe into the ink supply container may vary due to variation of the manufacturing tolerance of the holder, which may, for example, change the amount of flow of the ink into the ink tank and require a longer time to supply the ink, etc., thus making it impossible to stably supply the ink.

SUMMARY OF THE INVENTION

The present invention has been made in view of the above problems, and provides a technology that enables a tank for storing a liquid, such as an ink, to be stably supplied with the liquid.

A printing apparatus includes a printing unit that performs printing on a print medium by ejecting a printing agent to the print medium, a liquid storage tank that stores the printing agent to be supplied to the printing unit and is capable of being supplied with the printing agent through a pipe provided to the liquid storage tank so as to extend in a first direction, and a holder that includes a hole portion in which to insert the pipe and a cap that closes and opens the pipe inserted in the hole portion, and that is positioned in the first direction relative to the liquid storage tank and fixed to the first direction.

In accordance with the present invention, a tank for storing a liquid can be stably supplied with the liquid.

Further features of the present invention will become apparent from the following description of exemplary embodiments with reference to the attached drawings.

DESCRIPTION OF THE EMBODIMENTS

An exemplary embodiment of a printing apparatus and a liquid storage tank will be described in detail below with reference to the accompanying drawings. Note that the following embodiment does not limit the present invention, and not all the combinations of the features described in this embodiment are necessarily essential for the solution to be provided by the present invention. Moreover, the positions, shapes, and the like, of the components described in the embodiment are mere examples, and there is no intension to limit the scope of the present invention only to these.

(Configuration of Printing Apparatus)

The printing apparatus according to the present embodiment may be an apparatus having on a function of printing an image on a print medium by ejecting inks to the print medium, or a multi-function peripheral additionally having an image reading function, and the like. In the present embodiment, a printing apparatus capable of performing color printing by ejecting inks of multiple colors will be described as an example. Thus, in the present embodiment, ink tanks that store the inks, which are liquids, will each be described as an example of the liquid storage tank.

Note that the liquid that can be stored in the liquid storage tank according to the present embodiment is not limited to ink as a printing agent, but includes various publicly known types of printing agents that are used in printing, such as a process liquid with which to perform a predetermined process on ejected inks. The liquid that can be stored in the liquid storage tank according to the present embodiment also includes various types of liquids to be used in various publicly known apparatuses that obtain desired products by ejecting liquids.

The description will be given herein such that, in a frontal view of the side of the apparatus from which printed print media are discharged, the direction from the left side toward the right side of the apparatus is the X direction, the direction from the far side (rear side) to the near side (front side) is the Y direction, and the direction from the lower side to the upper side is the Z direction. Thus, the X, Y, and Z directions are each a direction oriented from one side toward the other side and is a direction orthogonal to the others. Each direction will herein be prefixed by "+ (plus)" as appropriate in a case when the direction is oriented from the one side toward the other side, and be prefixed by "− (minus)" as appropriate in a case when the direction is oriented from the other side toward the one side.

Figure 1:
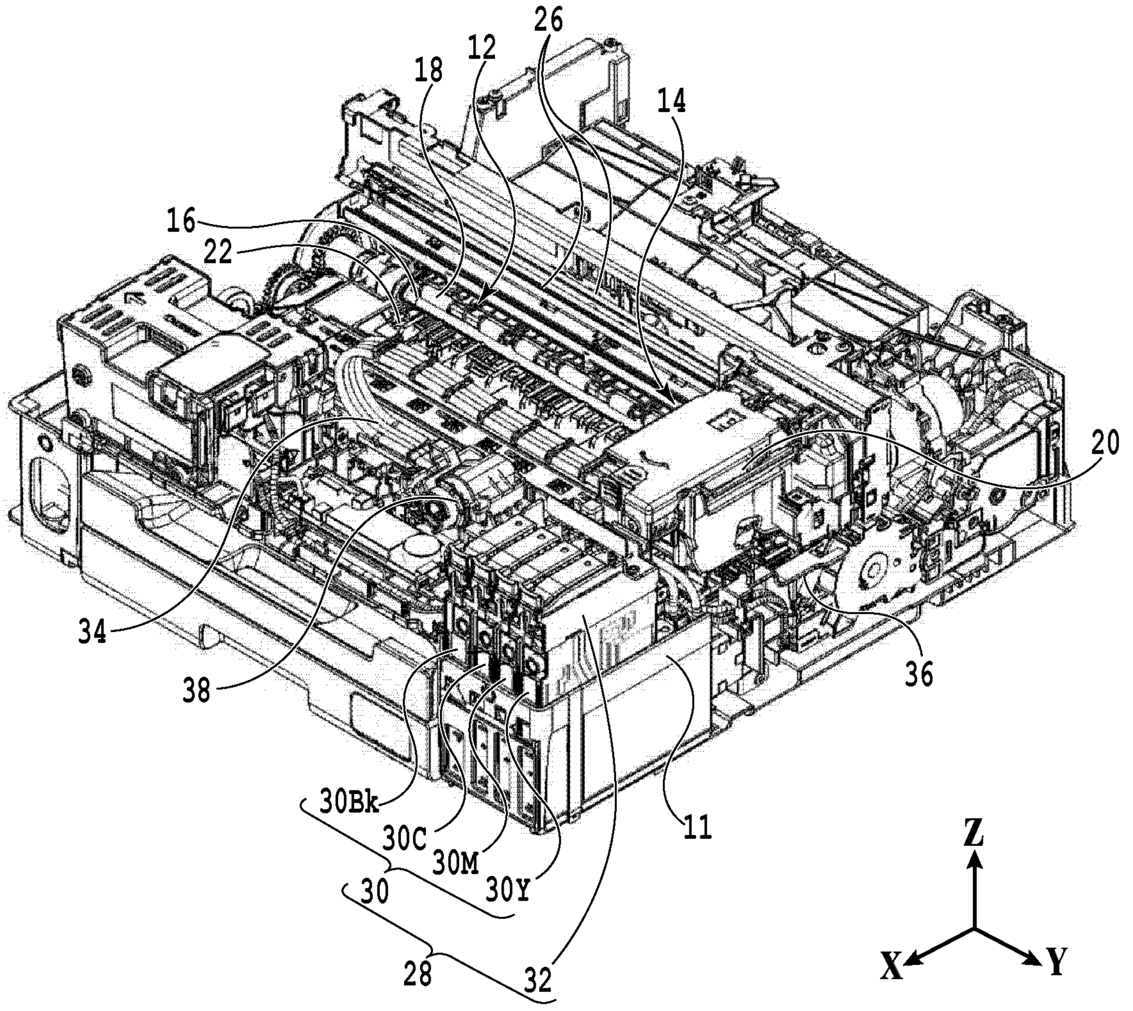
FIG. 1 is a schematic view of a configuration of a printing apparatus.

FIG. 1 is a schematic view of a configuration of a printing apparatus including a liquid storage tank according to the present embodiment. A printing apparatus 10 includes a conveyance unit 12 that conveys a print medium fed from a feed unit (not illustrated) in the Y direction, and a printing unit 14 that performs printing on the print medium conveyed by the conveyance unit 12 by ejecting the inks to the print medium. Incidentally, the print medium printed by the printing unit 14 will be discharged by a discharge unit (not illustrated) to the outside of the apparatus from the front of the apparatus. The printing apparatus 10 also includes a housing unit 11 that houses ink tanks (described later) that store the inks to be used in the printing by the printing unit 14. The printing apparatus 10 further includes a control unit (not illustrated) that controls the operation of the entire apparatus.

The conveyance unit 12 includes a conveyance roller 16 that is driven by a driving unit (not illustrated) and a pinch roller 18 that is in pressure contact with the conveyance roller 16 to follow the movement of the conveyance roller 16. The print medium fed by the feed unit is nipped between the conveyance roller 16 and the pinch roller 18 and conveyed to the printing unit 14 by rotation of the conveyance roller 16. The conveyance roller 16 is a metallic roller processed so as to form minute asperities on its surface to be in pressure contact with the pinch roller 18 and to exert a frictional force between itself and a print medium in a case of nipping the print medium in cooperation with the pinch roller 18. The pinch roller 18 is elastically biased toward the conveyance roller 16 by a biasing member, such as a spring.

The printing unit 14 includes a print head 20 that performs printing on the print medium conveyed by the conveyance unit 12 by ejecting the inks to the print medium, and a platen 22 that supports the conveyed print medium at a printing region at which the print head 20 ejects the inks to the print medium. This platen 22 is disposed so as to face the ejection port surface of the print head 20 in which ejection ports through which to eject the inks are formed. Thus, the print medium supported on the platen 22 maintains a predetermined distance from the ejection port surface of the print head 20. The print medium printed by the printing unit 14 is conveyed to the discharge unit and discharged by the discharge unit to the outside of the printing apparatus 10 from the front of the apparatus. At the discharge unit, the printed print medium is nipped between a discharge roller and a spur roller to be discharged, for example. The discharge roller is a rubber roller with a large coefficient of friction, for example, and the spur roller is elastically biased toward the discharge roller by biasing means, such as a spring, for example.

The print head 20 is mounted on a carriage 24, which is reciprocally movable in the X direction, so as to face the front surface of the print medium supported on the platen 22. In this way, the print head 20 is configured to be reciprocally movable in the X direction with the carriage 24. The carriage 24 is slidably provided on a pair of guide rails 26 extending in the X direction. The print head 20 is detachably mounted on the carriage 24. Also, the print head 20 is configured to be capable of ejecting the inks by an inkjet method. The print head 20 has components that generate a thermal energy as an energy to be used to eject the inks, such as heating elements, for example. Incidentally, the inkjet method employed by the print head 20 is not limited to the method using heating elements, and various publicly known methods including a method using piezoelectric elements are usable.

In the ejection port surface of the print head 20 facing the platen 22, multiple ejection ports for ejecting the inks are arrayed to form ejection port arrays. The ejection port arrays extend along a direction crossing the movement direction of the print head 20, e.g., the Y direction. The print head 20 is configured to be capable of ejecting inks of four different colors. Accordingly, an ejection port array is formed for each individual color in the ejection port surface of the print head 20.

In the present embodiment, the print head 20 is configured to be capable of ejecting inks of four colors of black (Bk), cyan (C), magenta (M), and yellow (Y). Note that the inks that can be ejected from the print head 20 are not limited to the inks of the four colors listed above. Specifically, the inks that can be ejected from the print head 20 may be inks of different colors than the above colors, and the number of colors may be less than or more than four.

The print head 20 is connected to an ink tank unit 28 housed in the housing unit 11 and storing the inks independently of each other, and is configured to be capable of ejecting the inks supplied from the ink tank unit 28 from the ejection ports. The ink tank unit 28 is connected to the print head 20 through tubes 34 provided for the individual ink types. Moreover, the printing apparatus 10 is configured to be capable of supplying the inks stored in the ink tank unit 28 to the print head 20 independently of each other by ink type. Note that the tubes 34 are provided with a valve 38 and, with the valve 38 closed, the tubes 34 are closed, thereby restricting supply of the inks to the print head 20 from the ink tank unit 28.

In printing by the printing apparatus 10 with the printing unit 14 described above, first, a print medium is moved to a printing start position by the conveyance unit 12. Then, a printing operation in which the print head 20 ejects the inks while being moved in the X direction is performed on the print medium conveyed to the printing start position. Thereafter, a conveyance operation in which the print medium is conveyed by a predetermined amount by the conveyance unit 12 is performed, followed by a printing operation again. The printing apparatus 10 performs predetermined printing on a print medium by alternately repeating a conveyance unit and a printing operation as described above.

The housing unit 11 houses the ink tank unit 28 storing the inks to be supplied to the print head 20 independently of each other by type. In the present embodiment, inside the housing unit 11, the ink tank unit 28 is fixed to a housing of the printing apparatus 10. Also, in the present embodiment, the housing unit 11 is provided on the front right side of the printing apparatus 10 and located in front of the print head 20 at a stand-by position. Note that the stand-by position is a position at which the print head 20 is located while not performing printing (see FIG. 1).

In the present embodiment, the ink tank unit 28 includes an ink tank 30Bk storing the Bk ink, an ink tank 30C storing the C ink, an ink tank 30M storing the Mink, and an ink tank 30Y storing the Y ink. In the present embodiment, the ink tanks 30C, 30M, and 30Y have the same configuration. The ink tank 30Bk is configured to be capable of storing a larger volume of ink than the ink tank 30C and the like. On each ink tank 30, a holder 32 is disposed which includes components such as cap units 206 (see FIG. 2) for closing and opening ink inlet pipes 202 (see FIG. 2) provided for the respective ink tanks. Details of the configuration of the ink tank unit 28 will be described later.

The printing apparatus 10 also includes a recovery unit 36 that performs a recovery operation for maintaining the ink ejection performance of the print head 20 well or recovering it. The recovery unit 36 is disposed at such a position as to face the ejection port surface of the print head 20 located at the stand-by position. The recovery unit 36 includes a cap unit that caps the ejection port surface of the print head 20 to protect it, a suction unit that forcibly sucks the inks, a suction unit that forcibly sucks the inks out of the print head 20 with the ejection port surface capped, a wiper unit that wipes the ejection port surface, and the like, for example.

(Configuration of Ink Tank Unit)

Figure 2:
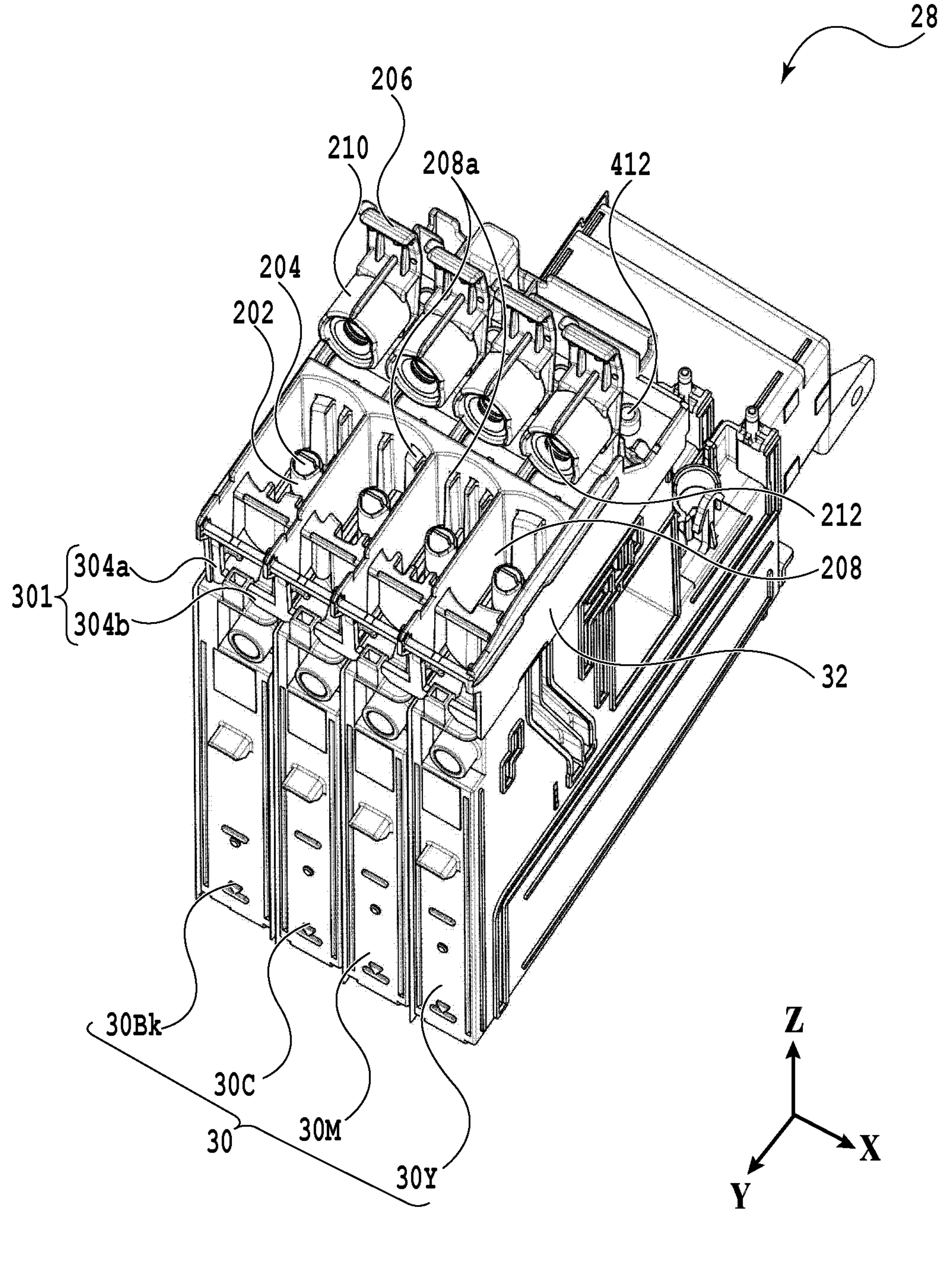
FIG. 2 is a perspective view of an ink tank unit.
Figure 3:
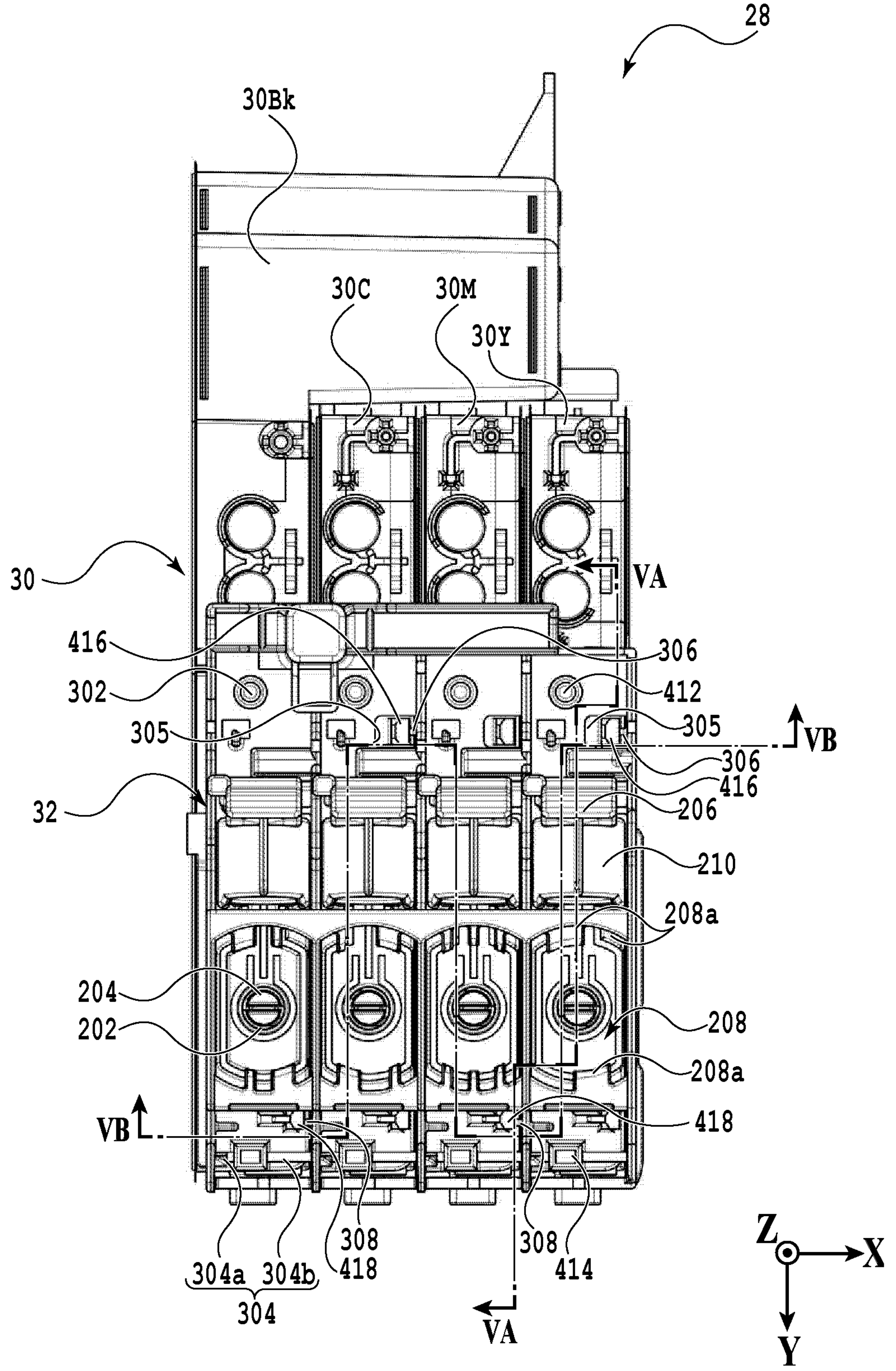
FIG. 3 is a plan view of the ink tank unit.

Next, the configuration of the ink tank unit 28 will be described. FIG. 2 is a perspective view of the configuration of the ink tank unit 28. FIG. 3 is a plan view of the ink tank unit 28. Incidentally, FIGS. 2 and 3 illustrate a state where the cap units of the holder 32 are opened, thereby opening openings of the ink inlet pipes. Also, the following description of the ink tank unit 28, the ink tanks 30, and the holder 32 using FIG. 2 and subsequent drawings will be given based on directions in the state where they are housed in the housing unit 11 of the printing apparatus 10 in order to facilitate the understanding.

The ink tank unit 28 includes the ink tanks 30 storing the inks and the holder 32 having components such as the cap units 206, which close and open the ink inlet pipes 202 provided upright on the upper surfaces of the ink tanks 30. In the present embodiment, the ink tanks 30Bk, 30C, 30M, and 30Y as the ink tanks 30 are arranged side by side in this order in the +X direction (see FIG. 2). Note that the arrangement of the ink tanks in the X direction is not limited to the above.

<Configuration of Holder>

The holder 32 includes hole portions 208 in which the ink inlet pipes 202 are inserted and the cap units 206 that close and open the ink inlet pipes 202 inserted in the hole portions 208. The cap units 206 are provided respectively for the ink inlet pipes 202 of the ink tanks 30, and the cap units 206 are provided so as to be openable and closable independently of each other in the holder 32. Each cap unit 206 includes a cap 210 which, in a closed state, closes an opening 204 of the ink inlet pipe 202 and, in an open state, opens the opening 204 of the ink inlet pipe 202. The cap 210 is formed so as to be capable of being inserted into and pulled out of the hole portion 208 with opening and closing operations of the cap unit 206. Note that "closing (opening) the opening 204 of the ink inlet pipe 202" will herein be expressed as "closing (opening) the ink inlet pipe 202" as appropriate.

Each cap 210 includes a seal portion 212 that comes into tight contact with an outer peripheral portion of the ink inlet pipe 202 (an insertion portion 402 to be described later) in a case of closing the ink inlet pipe 202. In this way, the ink inside the ink tank 30 will not leak from the ink inlet pipe 202 in a case when the cap unit 206 is closed. The holder 32 includes a shaft portion 502 (see FIG. 5A) for supporting the cap units 206 in an openable and closable manner, and the cap units 206 are supported on the shaft portion via bearings 504 (see FIG. 5A). The shaft portion 502 is provided so as to extend in the X direction.

On the inner peripheral surface of each hole portion 208, multiple protrusions 208*a* are formed at different positions in different shapes so as to extend in the Z direction and protrude in the Y direction. Accordingly, the hole portions 208 appear differently in shape in a case when the hole portions 208 are viewed from the −Z direction. Incidentally, the hole portions 208 are through-holes. Thus, in FIG. 3, the shapes of the inside of the hole portions 208 excluding the protrusions 208*a* are defined by upper surfaces 30*a* (see FIG. 4) of the ink tanks 30.

The holder 32 includes holes 302 and nipping members 304 for positioning in an XY plane relative to the ink tank 30. The holes 302 are through-holes formed on the rear side of the holder 32 through which first upright members 412 (described later) provided on the ink tanks 30 can be inserted. Note that the holes 302 are preferably formed in such a size and shape as to leave no play in the state where the first upright members 412 are inserted, for example. The nipping members 304 are formed on the front side of the holder 32 in such a shape as to be capable of nipping second upright members 414 (described later) provided on the ink tanks 30 in the X direction. Specifically, each nipping member 304 includes a first contact portion 304*a* that comes into contact with the second upright member 414 from the left, and a second contact portion 304*b* that comes into contact with the second upright member 414 from the right (see FIG. 2).

The holder 32 further includes first protruding members 306 and second protruding members 308 for positioning in the +Z direction relative to the ink tank 30. The first protruding members 306 are formed on the rear side of the holder 32 in such a rib shape (see FIG. 5B) as to be engageable with first claw members 416 provided on some ink tanks 30 (described later) inside openings 305 through which the first claw members 416 can be inserted. The second protruding members 308 are formed on the front side of the holder 32 in such a rib shape (see FIG. 5B) as to be engageable with second claw members 418 provided on some ink tanks 30 (described later).

In the holder 32, the cap units 206, the hole portions 208, the holes 302, the nipping members 304, the first protruding members 306, and the second protruding members 308 are provided at positions corresponding to counterparts formed on the upper surfaces 30*a* of the four ink tanks 30. In the present embodiment, in the holder 32, the first protruding members 306 or the second protruding members 308 are provided at corresponding positions on some ink tanks. Specifically, the first protruding members 306 are provided at positions corresponding to components on the ink tanks 30C and 30Y, and the second protruding members 308 are provided at positions corresponding to components on the ink tanks 30Bk and 30M. Note that the first protruding members 306 and the second protruding members 308 may both be provided at corresponding positions on all ink tanks. In this case, the first claw members 416 and the second claw members 418 are provided on the upper surfaces of all ink tanks 30.

<Configuration of Ink Tanks>

Figure 4:
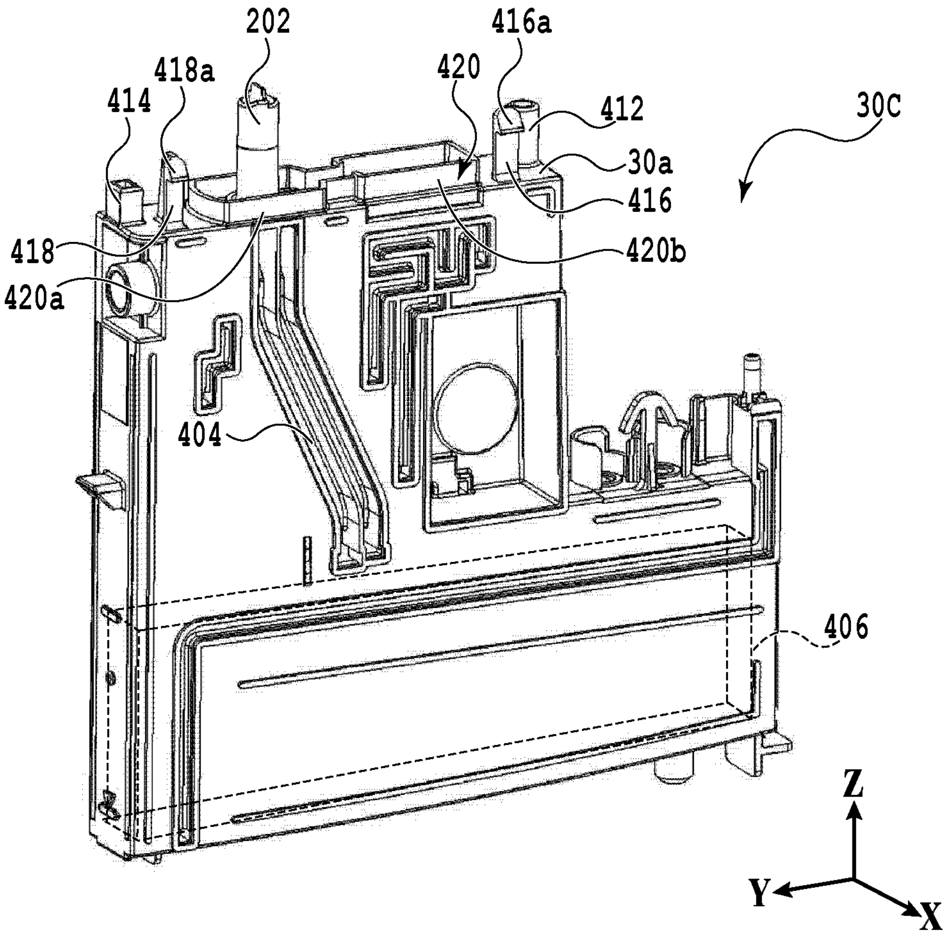
FIG. 4 is a perspective view of an ink tank.

Next, the configuration of the ink tanks 30 will be described. In the present embodiment, the ink tanks 30C, 30M, and 30Y and the ink tank 30Bk differ only in the volume of the ink that can be stored. Thus, the following description will be given on the configuration of the ink tank 30C, and a description of the configurations of the other ink tanks will be omitted. FIG. 4 is a perspective view of the configuration of the ink tank 30C.

The ink tank 30C is provided with an ink inlet pipe 202 for introducing the ink into the ink tank 30C. The ink tank 30C is configured to be capable of being supplied with the ink from an ink supply container 600 through the ink inlet pipe 202. Specifically, the ink inlet pipe 202 is provided upright toward the upper side on the upper surface 30*a* of the ink tank 30C and is formed so as to be insertable into the ink supply container 600 (described later). Moreover, the ink tank 30C includes a channel portion 404 that guides the ink introduced into the inside from the ink inlet pipe 202 to a storage chamber 406. Incidentally, films were welded to the side surfaces of the ink tank 30C, thereby sealing components such as the channel portion 404.

The ink tank 30C includes a first upright member 412 of a substantially columnar shape provided upright near the rear end of the upper surface 30*a* so as to be insertable through the hole 302 provided in the holder 32. In the present embodiment, the hole 302 is formed in a circular shape and the first upright member 412 is formed in a substantially circular columnar shape, but the shapes are not limited to these. The hole 302 may be formed in a polygonal shape, and the first upright member 412 may be made in a substantially polygonal columnar shape corresponding to the hole 302. Also, the first upright member 412 is not limited to a substantially columnar shape and may be in a substantially tubular shape. The ink tank 30C also includes a second upright member 414 provided upright near the front end of the upper surface 30*a* in such a substantially columnar shape (or such a substantially tubular shape) so as to be capable of being nipped by a nipping member 304 provided to the holder 32. In the present embodiment, the second upright member 414 can be nipped by the nipping member 304 from the −X direction and the +X direction. Due to this configuration, the surfaces to be in contact with the nipping member 304 are preferably surfaces parallel to a YZ plane orthogonal to the X direction.

The ink tank 30C includes a first claw member 416 provided upright on the rear side of the upper surface 30*a* so as to be engageable with a first protruding member 306 provided on the holder 32. The first claw member 416 is provided at a position that does not overlap the first upright member 412 in the Y direction. The first claw member 416 includes a barb portion 416*a* at the top. This barb portion 416*a* and the first protruding member get engaged with each other to restrict movement of the holder 32 in the +Z direction. The ink tank 30C also includes a second claw member 418 provided upright on the front side of the upper surface 30*a* so as to be engageable with a second protruding member 308 provided on the holder 32. The second claw member 418 is provided at a position that does not overlap the second upright member 414 in the Y direction. The second claw member 418 includes a barb portion 418*a* at the top. This barb portion 418*a* and the second protruding member get engaged with each other to restrict movement of the holder 32 in the +Z direction.

The ink tank 30C further includes a frame portion 420 formed as a rib provided upright on the upper surface 30*a* so as to surround a region covering the ink inlet pipe 202. In the present embodiment, the frame portion 420 is provided so as to extend in the Y direction between the first claw member 416 and the second claw member 418. The frame portion 420 includes a first abutment portion 420*a*, which is located inside the hole portion 208 in the X and Y directions in the case when the holder 32 is mounted, and against which the ink supply container 600 inserted in the hole portion 208 abuts. In the present embodiment, the shape of the first abutment portion 420*a* is formed to be slightly smaller than the opening size of the hole portion 208. Thus, in the hole portion 208 of the holder 32 mounted to the ink tank 30, the first abutment portion 420*a* as viewed from the −Z direction is present near the inner peripheral surface of the hole portion 208 (see FIG. 3). The frame portion 420 also includes a second abutment portion 420*b* against which a bottom surface 32*a* of the holder 32 abuts in the case when the holder 32 is mounted. In the present embodiment, the second abutment portion 420*b* is formed such that the region surrounded by the second abutment portion 420*b* (predetermined region) and the region surrounded by the first abutment portion 420*a* are connected.

In the above description, the ink tanks 30C, 30M, and 30Y and the ink tank 30Bk differ only in the volume of the ink that can be stored. However, as illustrated in FIG. 3, an opening 305 is not formed at a position on the holder 32 corresponding to the first claw member 416 of the ink tank 30Bk. Thus, in the present embodiment, the ink tank 30Bk is not provided with a first claw member 416.

(Positioning of Holder Relative to Ink Tanks)

Figure 5A:
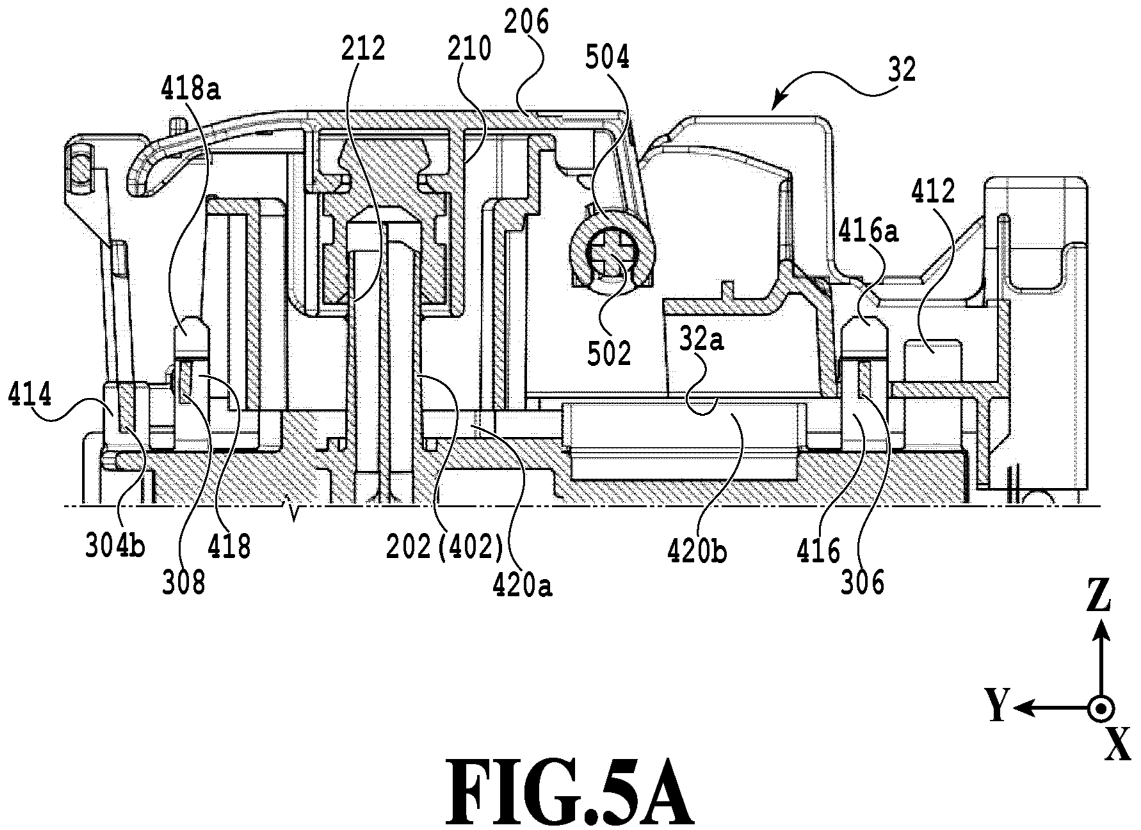
FIGS. 5A and 5B are cross-sectional views taken along lines in FIG. 3.
Figure 5B:
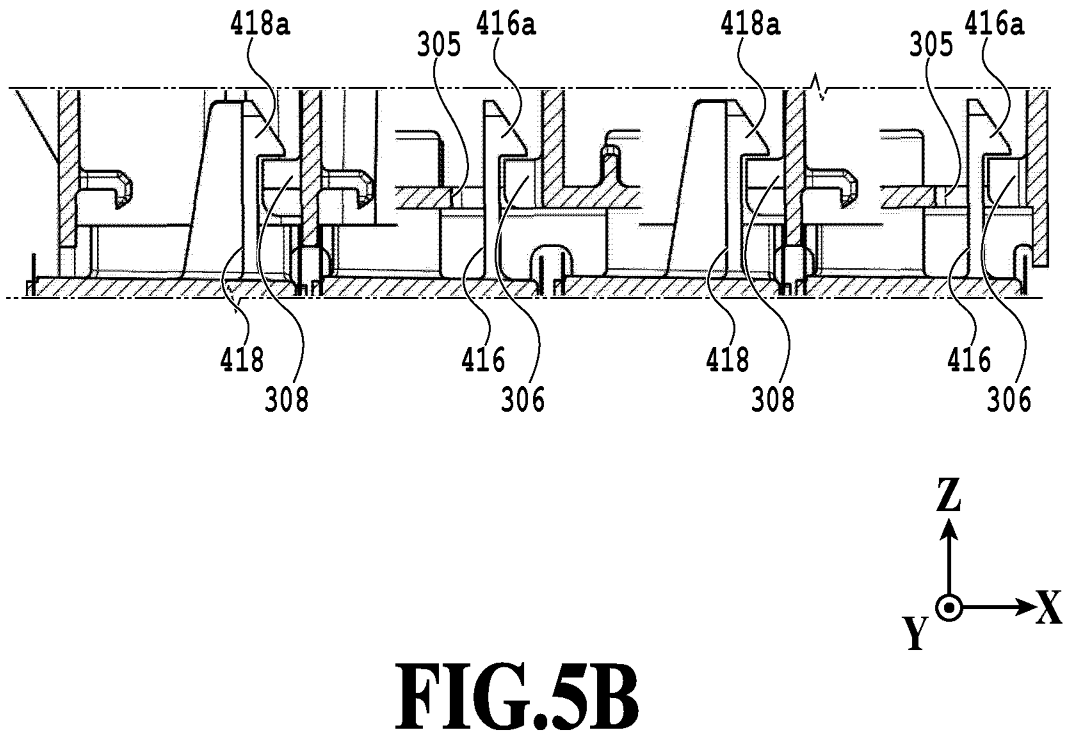

Next, positioning of the holder 32 on the ink tanks 30 will be described. FIG. 5A is a cross-sectional view along the Va-Va line in FIG. 3. FIG. 5B is a cross-sectional view along the Vb-Vb line in FIG. 3. In FIG. 5A, the cap unit 206 is closed.

To mount the holder 32 to the ink tanks 30, the ink inlet pipes 202 extending upward from the upper surfaces 30*a* of the ink tanks 30 are inserted into the respective hole portions 208 of the holder 32 (see FIGS. 2 and 3). Moreover, the first upright members 412 provided on the upper surfaces 30*a* of the ink tanks 30 are inserted through the respective holes 302 of the holder 32 (see FIG. 3). Further, the second upright members 414 provided upright on the upper surface 30*a* of the ink tanks 30 are nipped by the respective nipping members 304 of the holder 32 (see FIGS. 2 and 3). Furthermore, the first protruding members 306 of the holder 32 are engaged with the first claw members 416 provided upright on the upper surfaces 30*a* of the ink tanks 30C and 30Y (see FIGS. 5A and 5B). Also, the second protruding members 308 of the holder 32 are engaged with the second claw members 418 provided upright on the upper surfaces 30*a* of the ink tanks 30Bk and 30M (see FIGS. 5A and 5B).

With the first upright members 412 inserted through the holes 302 and the second upright members 414 nipped by the nipping members 304, the holder 32 are positioned relative to and fixed to the ink tanks 30 in an XY plane (X and Y directions). In other words, the holder 32 is fixed at two different positions in the Y direction on each ink tank 30 and, at one of the two positions, the holder 32 is positioned by being fixed so as to restrict its movement in the X direction. As a result, the holder 32 is positioned relative to the ink tank 30 in the X and Y directions.

In the state where each ink tank 30 is mounted to the holder 32, the first protruding member 306 is in contact with the lower surface of the barb portion 416*a* of the first claw member 416 inserted through the opening 305 (see FIGS. 5A and 5B). Also, the second protruding member 308 is in contact with the lower surface of the barb portion 418*a* of the second claw member 418. This restricts movement of the holder 32 in the +Z direction on the ink tank 30. Also, in the state where each ink tank 30 is mounted to the holder 32, the bottom surface 32*a* of the holder 32 is in abutment with the second abutment portion 420*b* of the frame portion 420 of the ink tank 30. This restricts movement of the holder 32 in the −Z direction on the ink tank 30. In other words, the holder 32 is nipped by the two types of members provided at different positions in the Z direction on each ink tank 30 (the barb portions 416*a* and 418*a* and the second abutment portion 420*b*), so that the holder 32 is positioned relative to and fixed to the ink tank 30 in the Z direction. Thus, in the present embodiment, the first claw member 416 (barb portion 416*a*), the second claw member 418 (barb portion 418*a*), and the second abutment portion 420*b* function as a positioning unit that enables the holder 32 to be positioned in the Z direction relative to the ink tank 30 and mounted to it.

Note that the member that contacts the bottom surface 32*a* of the holder 32 in the state where the ink tank 30 is mounted to the holder 32 is not limited to the second abutment portion 420*b*. For example, the holder 32 may be provided with a component that can contact the upper surface 30*a* of the ink tank 30, or the holder 32 and the ink tank 30 may both include components that contact each other in the state where the ink tank 30 is mounted to the holder 32.

(Supply of Ink Tanks with Inks)

Figure 6A:
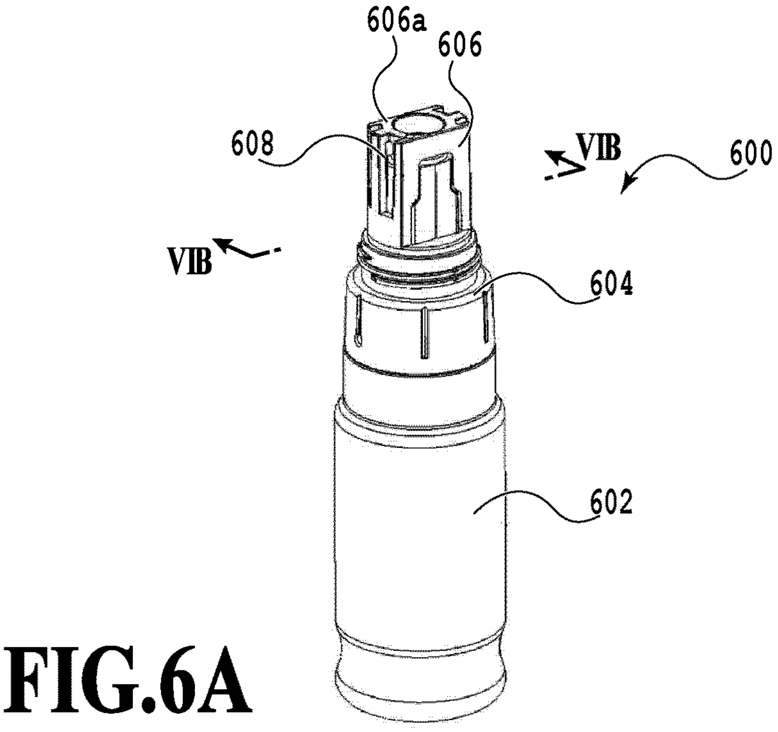
FIGS. 6A to 6C are views of a configuration of an ink supply container.
Figure 6B:
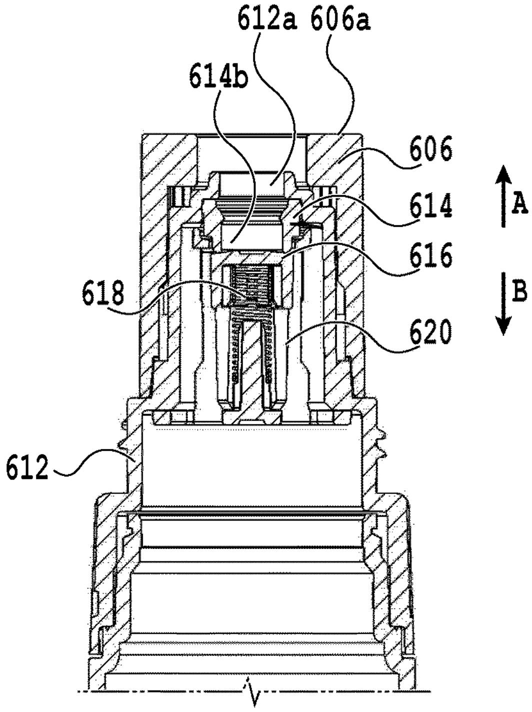
Figure 6C:
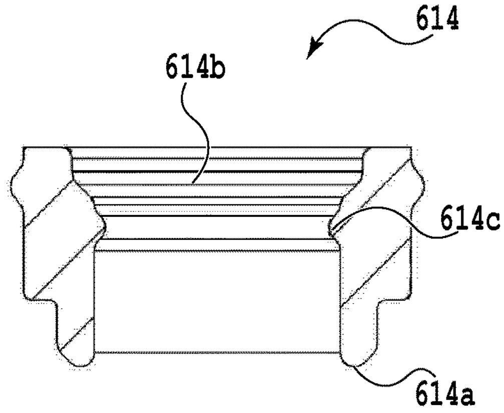

Next, the supply of the ink tanks 30 with the inks will be described. First, a configuration of an ink supply container will be described with reference to FIGS. 6A to 6C. FIGS. 6A to 6C are schematic views of the configuration of the ink supply container. FIG. 6A is a perspective view, FIG. 6B is a cross-sectional view along VIb-VIb line in FIG. 6B, and FIG. 6C is an enlarged view of a rubber seal in FIG. 6B.

<Configuration of Ink Supply Container>

The ink supply container 600, which has a bottle shape, includes an ink housing portion 602 that houses an ink, and an outlet portion 604 that permits and restricts flow of the ink housed in the ink housing portion 602 to the outside (see FIG. 6A). The ink supply container 600 also includes a mechanical identification (ID) portion 606 that is insertable into a hole portion 208 of the holder 32. In side surfaces of the mechanical ID portion 606, there are formed multiple groove-shaped recesses 608 extending in the height direction of the ink supply container 600. These recesses 608 are formed at different positions in different widths for each type (color) of ink to be housed in the ink housing portion 602.

Here, on the inner peripheral surface of each hole portion 208 of the holder 32 in which to insert an ink inlet pipe 202, there are formed protrusions 208*a* extending in the Z direction at different positions in different widths according to the type of the ink stored in the corresponding ink tank 30. To supply the ink tank 30 with the ink, the mechanical ID portion 606 of the ink supply container 600 is inserted into the hole portion 208. Thus, the recesses 608 are formed so as to be engageable only with the protrusions 208*a* formed on the hole portion 208 in which to insert the ink inlet pipe 202 of the ink tank 30 that stores the same type of ink as the ink housed in the ink housing portion 602.

The outlet portion 604 includes a casing member 612 forming the a casing of the outlet portion 604, and a seal member 614 made of an elastic material, such as rubber, and having an opening formed so as to communicate with an opening 612*a* of the casing member 612 (see FIG. 6B). Note that the opening 612*a* of the casing member 612 communicates with an opening provided in the mechanical ID portion 606. The outlet portion 604 also includes a valve member 616 that is capable of contacting the seal member 614 to close an opening 614*b* of the seal member 614, and a biasing member 618, such as a spring, that biases the valve member 616 toward the seal member 614 (see the direction of the arrow A in FIG. 6B). The outlet portion 604 further includes a guide member 620 that guides movement of the valve member 616 in a direction toward the seal member 614 and a direction away from the seal member 614 (see the direction of the arrow B in FIG. 6B). Note that the movement direction of the valve member 616 is the height direction of the ink supply container 600, and is the direction in which the ink supply container 600 is inserted into and pulled out of the hole portion 208. Also, the valve member 616 is biased in the direction of the arrow A by the biasing member 618 to be in contact with a bottom 614*a* of the seal member 614 and thereby close the opening 614*b* of the seal member 614.

As the mechanical ID portion 606 of the ink supply container 600 is inserted into the hole portion 208 of the holder 32, the ink inlet pipe 202 located inside the hole portion 208 gets inserted into the opening 612*a* of the casing member 612 and the opening 614*b* of the seal member 614 through the opening of the mechanical ID portion 606. As the mechanical ID portion 606 is inserted farther, the ink inlet pipe 202 comes into contact with the valve member 616 and moves the valve member 616 in the direction of the arrow B against the biasing force of the biasing member 618, so that the valve member 616 gets separated from the bottom 614*a* of the seal member 614 and opens the opening 614*b*. As a result, the opening 204 of the ink inlet pipe 202 and the inside of the ink housing portion 602 communicate with each other. Incidentally, inside the opening 614*b* of the seal member 614, a seal portion 614*c* is formed, which becomes smaller in diameter toward the center of the opening. Thus, the seal portion 614*c* comes into tight contact with the outer peripheral surface of the insertion portion 402 inserted in the opening 614*b* of the seal member 614. This makes it difficult for the ink inside the ink housing portion 602 to leak from between the outlet portion 604 and the ink inlet pipe 202 when the ink inlet pipe 202 is inserted into the outlet portion 604.

<Supply of Ink>

Figure 7:
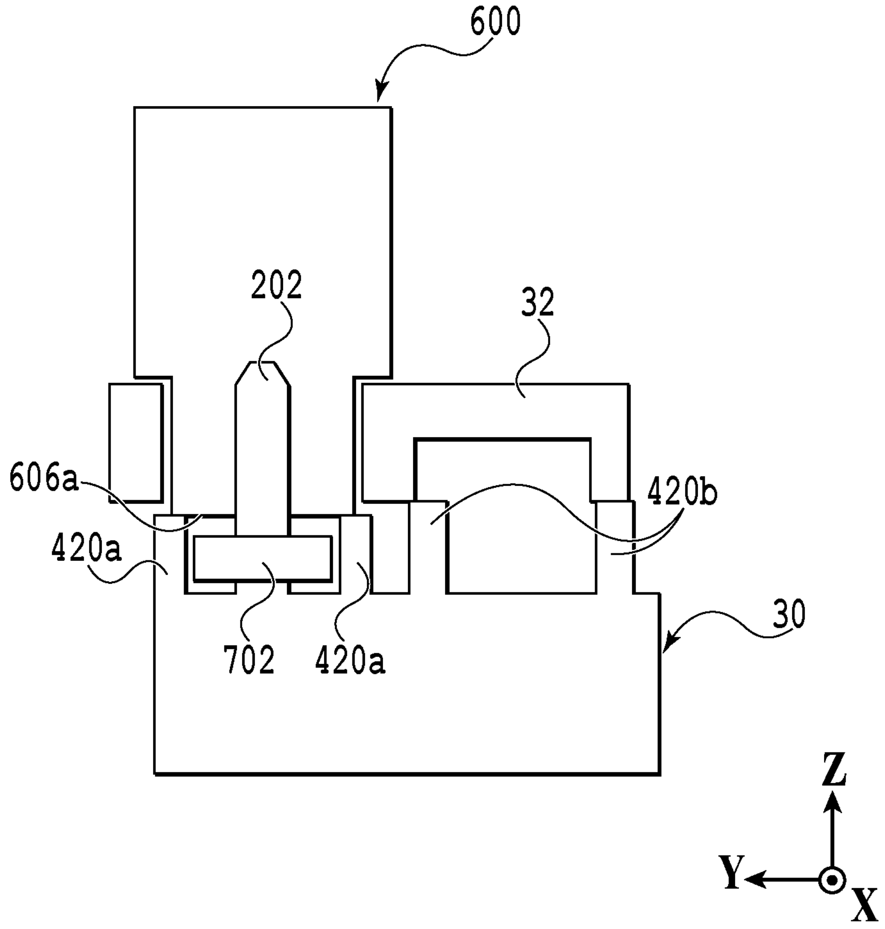
FIG. 7 is a diagram illustrating a state where the ink supply container is inserted in an ink inlet pipe.

Next, the operations and effects of components in the supply of the ink from the ink supply container 600 into the corresponding ink tank 30 will be described. FIG. 7 is a diagram illustrating the positions of the ink inlet pipe 202, the first abutment portion 420*a*, and the ink supply container 600 in a simplified fashion in a case when the ink supply container 600 is inserted in the corresponding hole portion 208 of the holder 32.

To supply the ink tank 30 with the ink in the ink supply container 600, the ink supply container 600 is held with the mechanical ID portion 606 facing down, and the mechanical ID portion 606 is inserted into the hole portion 208. At this time, in a case when, for example, the ink stored in the ink tank 30 and the ink housed in the ink supply container 600 are different, the recesses 608 in the mechanical ID portion 606 and the protrusions 208*a* in the hole portion 208 do not fit each other. Hence, the mechanical ID portion 606 cannot be inserted into the hole portion 208.

The hole portion 208 is a through-hole. In a view of the hole portion 208 from the −Z direction, the first abutment portion 420*a* provided on the upper surface 30*a* of the ink tank 30 is exposed near the inner peripheral surface of the hole portion 208 at the bottom of the hole portion 208 (see FIG. 3). For this reason, an end surface 606*a* of the mechanical ID portion 606 inserted in the hole portion 208 is inserted to such a position as to abut against the first abutment portion 420*a* (see FIG. 7). In sum, in the present embodiment, the ink supply container 600 and a component of the ink tank 30 come into direct contact with each other during the supply of the ink.

As the mechanical ID portion 606 is inserted into the hole portion 208, the insertion portion 402 comes into contact with the valve member 616 through the opening of the mechanical ID portion 606, the opening 612*a* of the casing member 612, and the opening 614*b* of the seal member 614. As the mechanical ID portion 606 is inserted farther into the hole portion 208, the insertion portion 402 moves the valve member 616 in the direction of the arrow B against the biasing force of the biasing member 618 (see FIG. 6B). As a result, the ink housing portion 602 and the opening 204 of the ink inlet pipe 202 communicate with each other, so that the ink housed in the ink housing portion 602 flows into the storage chamber 406 of the ink tank 30 through the opening 204, the ink inlet pipe 202, and the channel portion 404 under its own weight. Note that the opening 204 of the ink inlet pipe 202 has such a shape as to be capable of maintaining the communication with the inside of the ink inlet pipe 202 and its opening 204 even in the state where the ink inlet pipe 202 is in contact with the valve member 616.

An absorber 702 capable of absorbing inks, for example, is disposed inside the first abutment portion 420*a* of the frame portion 420 (see FIG. 7). Thus, in a case when the ink left on the side surface of the insertion portion 402 as a result of inserting and pulling the ink supply container 600 drips under its own weight to the space inward of the first abutment portion 420*a*, the absorber 702 will absorb the dripped ink.

(Advantageous Effects)

As described above, the printing apparatus 10 is configured such that the ink tanks 30 each including an ink inlet pipe 202 through which to introduce an ink to the inside and the holder 32 provided with the cap units 206, which close and open the ink inlet pipes 202, are positioned in the X, Y, and Z directions. Specifically, the holder 32 is positioned in the X and Y directions relative to each ink tank 30 by being positioned at a point at one of two different positions in the Y direction and positioned in the X direction at the other position. Also, the holder 32 is positioned in the Z direction relative to each ink tank 30 being pinched by two types of members provided at different positions in the Z direction on the ink tank 30.

The above positioning improves the accuracy of the positioning of the holder 32 in the X direction relative to the ink tanks 30 and thus enables the caps 210 of the cap units 206 to properly close the ink inlet pipes 202. The positioning also makes the holder 32 resistant to displacement relative to the ink tanks 30 by shocks applied to the printing apparatus 10, and the like, and thus prevents or reduces solidification of the inks at the ink inlet pipes 202 and enables stable filling of the inks.

Also, the holder 32 is configured such that each hole portion 208 to insert the ink supply container 600 is a through-hole, and the first abutment portion 420*a* provided on the corresponding ink tank 30 is exposed on the lower side of the hole portion 208 inside the hole portion 208. This allows the end surface 606*a* of the mechanical ID portion 606 of the ink supply container 600 inserted in the hole portion 208 to be in direct contact with a component of the ink tank 30, and makes the amount of insertion of the ink inlet pipe 202 (insertion portion 402) into the ink supply container 600 less likely to vary.

Thus, even in a case when an unexpected contact occurs while the ink is supplied, the ink supply container will not be easily pulled out of the ink inlet pipe as compared to the publicly known technology in which an ink supply container and an ink tank do not directly contact each other and therefore the amount of insertion of an ink inlet pipe into the ink supply container easily varies. Accordingly, the ink will be stably filled into the ink tank.

Also, the configuration to bring the ink supply container into direct contact with the ink tank increases the amount of insertion of the ink inlet pipe into the ink supply container as compared to the publicly known technology in which an ink supply container is not brought into direct contact with an ink tank.

Here, in the present embodiment, the length of the ink inlet pipe 202 is 20 mm at most due to constraints on the mold, and therefore the ink inlet pipe 202 cannot simply be made long to provide a sufficient amount of insertion of the ink supply container 600. Incidentally, the channels in the ink inlet pipe 202 and the channel portion 404 are designed such that their channel diameters increase toward the opening 204 in order to improve the mold's releasability. Accordingly, the mold is narrow around the opening 204, which makes it impossible to guarantee mold strength necessary for mass production. While making the diameter of the ink inlet pipe 202 large allows the insertion portion 402 to be long while maintaining certain mold strength, the diameter of the ink inlet pipe 202 is set to 6.4 mm in the present embodiment in consideration of the apparatus size and the ease of introduction of the ink.

With the technology according to the present embodiment, it is possible to increase the amount of insertion of an ink inlet pipe into an ink supply container as compared the publicly known technology even in a case where there are design constraints as mentioned above.

(Other Embodiments)

Note that the above embodiment may be modified as described in (1) to (4) below.

Figure 8A:
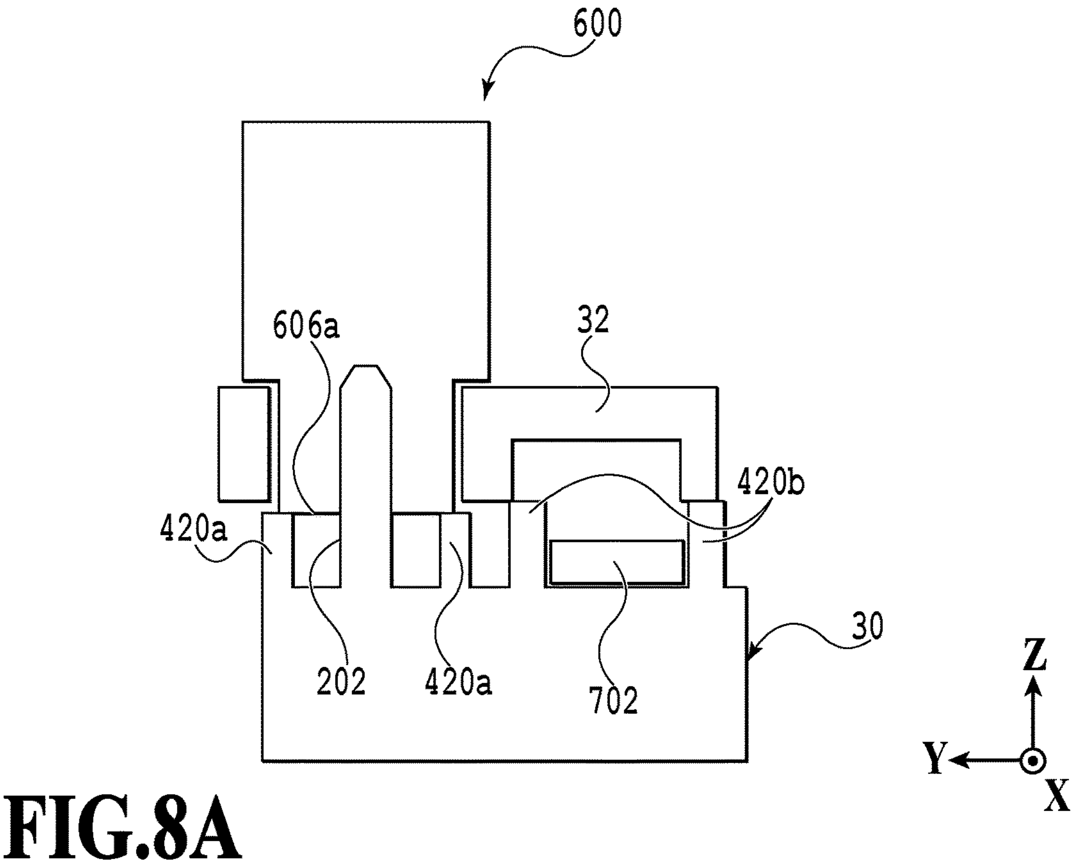
FIGS. 8A and 8B are a diagram and a view illustrating a modification of the position to dispose an absorber.
Figure 8B:
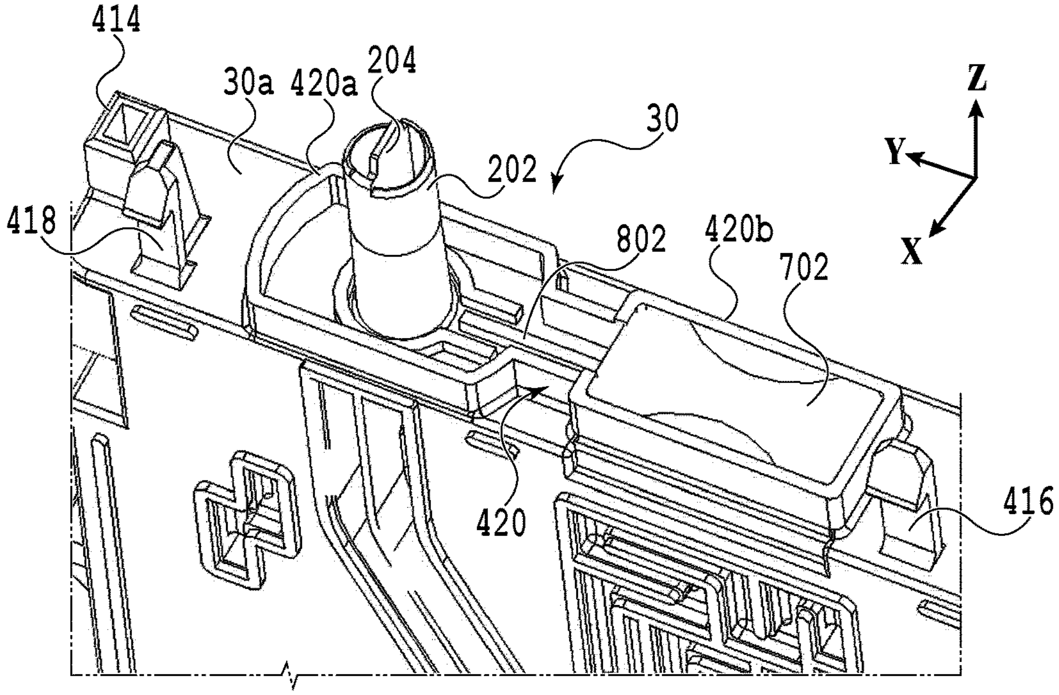

(1) In the above embodiment, the absorber 702 is disposed around the ink inlet pipe 202 inside the first abutment portion 420*a* of the frame portion 420, but is not limited to this arrangement. For example, the absorber 702 may be disposed in the region inside the second abutment portion 420*b*, the region inside being formed to be connected to the first abutment portion 420*a* (see FIG. 8A). In this case, multiple ribs 802, which extend from the first abutment portion 420*a* to the second abutment portion 420*b*, are formed with a constant interval left between the adjacent ribs in order to guide the ink from the first abutment portion 420*a* to the second abutment portion 420*b* (see FIG. 8B). The constant interval is such an interval as to cause a capillary phenomenon of the ink. In other words, these ribs 802 function as a guide member that guides the ink from the region inside the first abutment portion 420*a* to the region inside the second abutment portion 420*b*. FIGS. 8A and 8B are a diagram and a view illustrating a modification of the position to dispose the absorber. FIG. 8A is a diagram schematically illustrating a state where the absorber 702 is disposed inside the second abutment portion 420*b*. FIG. 8B is a view illustrating the ribs 802 provided inside the second abutment portion 420*b*.

In the case of providing the absorber 702 inside the second abutment portion 420*b*, the ink dripping from the insertion portion 402 is guided to from the first abutment portion 420*a* to the second abutment portion 420*b* by the capillary phenomenon with the ribs 802 and then absorbed by the absorber 702. Also, one of the ribs 802 is provided so as to surround the insertion portion 402. This makes it possible to reliably receive the ink dripped from the insertion portion 402 with the rib, and the received ink will be guided to the absorber 702 by the capillary phenomenon and therefore unlikely to spread inside the first abutment portion 420*a*.

Note that, in the case when the absorber 702 is disposed inside the first abutment portion 420*a*, there is a possibility that the absorber 702 may touch the end surface 606*a* of the mechanical ID portion 606 when the end surface 606*a* is brought into abutment with the first abutment portion 420*a*, depending on the thickness of the absorber 702 (the length in the Z direction). If the absorber 702 touches the end surface 606*a*, the ink absorbed in the absorber 702 gets transferred onto the end surface 606*a*. This leads to a possibility that the ink on the ink supply container 600 after the supply may get attached to the user and/or the printing apparatus 10. However, such concerns do not exist in the case where the absorber 702 is disposed inside the second abutment portion 420*b*.

Figure 9:
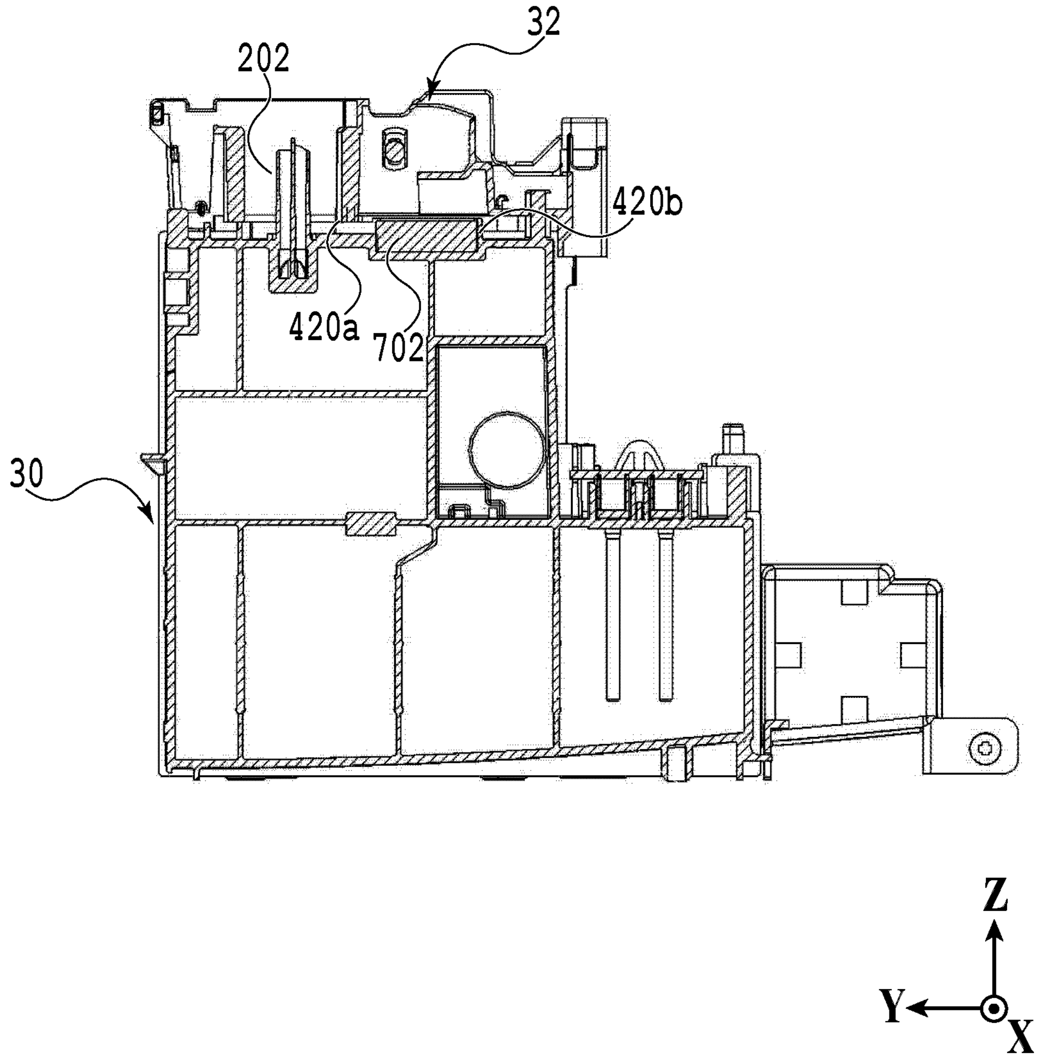
FIG. 9 is a view illustrating a modification of the position to dispose the absorber.

Also, the second abutment portion 420*b* is formed to be longer in the Z direction than the first abutment portion 420*a*. Accordingly, the absorber 702 can be made larger in size in the Z direction, which increases the amount of the ink to be absorbed by the absorber 702. Moreover, the region of the upper surface 30*a* of the ink tank 30 located inside the second abutment portion 420*b* can be formed in a downwardly recessed shape to make the absorber 702 even larger in size in the Z direction (see FIG. 9). FIG. 9 is a view illustrating a modification of the position to dispose the absorber.

Furthermore, in the case when the absorber 702 is disposed inside the second abutment portion 420*b*, the first abutment portion 420*a* may be omitted and portions of the ribs 802 may be extended to be long in the height direction. In this way, the end surface 606*a* of the mechanical ID portion 606 of the ink supply container 600 inserted in the hole portion 208 can be brought into abutment with these portions of the ribs 802 formed to be long in the height direction. Incidentally, in this case, the portions of the ribs 802 extended to be long in the height direction are preferably at positions on the ribs 802 where the ink dripping from the ink inlet pipe 202 is unlikely to get attached to them.

(2) In the above embodiment, the printing apparatus 10 is one that performs printing on a print medium conveyed in the Y direction by ejecting inks from a print head while moving it in the X direction, i.e., a serial scan-type printing apparatus, but is not limited to this type. Printing apparatuses to which the present invention is applicable may be, for example, ones that include a print head in which nozzle arrays are formed in the X direction over a length corresponding to the width of a printable print medium and that performs printing on a print medium conveyed in the Y direction relative to the print head at a fixed position, i.e., line-type printing apparatuses.

(3) In the above embodiment, the first abutment portion 420*a* is formed on the upper surface 30*a* of each ink tank 30 so as to surround the corresponding ink inlet pipe 202, but the configuration is not limited to the above. The configuration may be such that the first abutment portion 420*a* is omitted, and the end surface 606*a* of the mechanical ID portion 606 of the ink supply container 600 inserted in the corresponding hole portion 208 is brought into abutment with the upper surface 30*a*. That is, in this case, the end surface 606*a* is brought into abutment with the upper surface 30*a*, which is a flat surface. This increases the amount of insertion of the insertion portion 402 into the ink supply container 600.

(4) The various configurations described in the above embodiment and (1) to (3) above may be combined as appropriate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A printing apparatus comprising:

a printing unit that performs printing on a print medium by ejecting a printing agent to the print medium;

a liquid storage tank that stores the printing agent to be supplied to the printing unit and is capable of being supplied with the printing agent through a pipe provided to the liquid storage tank so as to extend in a first direction; and a holder that includes a hole portion in which to insert the pipe and a cap that closes and opens the pipe inserted in the hole portion, and that is positioned in the first direction relative to the liquid storage tank and fixed to the first direction, wherein the liquid storage tank has:

a first rib with which a container for supplying the liquid storage tank with the printing agent to be housed therein through the pipe is brought into abutment around the pipe in a case when the container is inserted into the hole portion;

a second rib that is formed so as to surround a predetermined region connected to a region surrounded by the first rib; and an absorber capable of absorbing the printing agent is disposed in the predetermined region.

2. The printing apparatus according to claim 1, wherein the liquid storage tank includes a claw member and an abutment portion provided at different positions in the first direction on a surface of the liquid storage tank where the pipe is provided, the claw member being provided upright, the abutment portion being a portion with which to bring the holder into abutment, and the holder is positioned in the first direction by being nipped by a barb portion provided on the claw member and the abutment portion.

3. The printing apparatus according to claim 1, wherein the holder is further positioned in a second direction orthogonal to the first direction and a third direction orthogonal to the first direction and the second direction relative to the liquid storage tank and fixed to the liquid storage tank.

4. The printing apparatus according to claim 3, wherein the holder is positioned by being fixed at two different positions in the second direction, the holder being fixed at one of the two positions so as to restrict movement in the third direction.

5. The printing apparatus according to claim 1, wherein the liquid storage tank further has an abutment portion, with which a container for supplying the liquid storage tank with the printing agent to be housed therein through the pipe is brought into abutment around the pipe, in a case when the container is inserted into the hole portion.

6. The printing apparatus according to claim 5, wherein the abutment portion is a rib and provided so as to be spaced from the pipe.

7. The printing apparatus according to claim 6, further comprising an absorber disposed around the pipe inside the abutment portion, the absorber being capable of absorbing the printing agent.

8. The printing apparatus according to claim 5, wherein the abutment portion is a flat surface on which the pipe is provided upright.

9. The printing apparatus according to claim 1, wherein the predetermined region is formed to be wider in the first direction than the region surrounded by the first rib.

10. The printing apparatus according to claim 1, wherein, inside the first rib, a third rib is formed that guides the printing agent to the predetermined region by utilizing a capillary phenomenon.

11. The printing apparatus according to claim 10, wherein the third rib is formed so as to surround the pipe.

12. The printing apparatus according to claim 1, wherein the first rib is formed so as to surround a region around the pipe and the second rib is formed so as to surround a predetermined region connected to a region surrounded by the first rib, and the first rib is provided so as to extend from the region around the pipe to the predetermined region to guide the printing agent to the predetermined region by utilizing a capillary phenomenon, and is formed to be long in the first direction at a portion of the region around the pipe such that a container for supplying the liquid storage tank with the printing agent to be housed therein through the pipe is brought into abutment with the portion in a case when the container is inserted into the hole portion.

13. A liquid storage tank comprising:

a storage chamber that is capable of storing a liquid;

a pipe that is provided so as to extend in a first direction and through which the liquid supplied from a container is introduced;

a channel that guides the liquid introduced through the pipe to the storage chamber;

a positioning unit that enables a holder to be positioned in the first direction and mounted, the holder including a cap that closes and opens the pipe, the holder including a hole portion in which to insert the pipe;

a first rib with which a container for supplying the liquid storage tank with the printing agent to be housed therein through the pipe is brought into abutment around the pipe in a case when the container is inserted into the hole portion;

a second rib that is formed so as to surround a predetermined region connected to a region surrounded by the first rib; and an absorber capable of absorbing the printing agent is disposed in the predetermined region.

14. The liquid storage tank according to claim 13, further comprising an abutment portion around the pipe, the abutment portion being a portion with which to bring the container into abutment, the container being a container into which to insert the pipe.

* * * * *